(12) United States Patent
Bandzeviciene

(10) Patent No.: US 12,004,673 B1
(45) Date of Patent: Jun. 11, 2024

(54) MULTIPLE PLANT HANGER

(71) Applicant: Ruta Bandzeviciene, St. Petersburg, FL (US)

(72) Inventor: Ruta Bandzeviciene, St. Petersburg, FL (US)

(*) Notice: Subject to any disclaimer, the term of this patent is extended or adjusted under 35 U.S.C. 154(b) by 72 days.

(21) Appl. No.: 17/741,334

(22) Filed: May 10, 2022

(51) Int. Cl.
*A47G 7/04* (2006.01)
*A01G 9/02* (2018.01)

(52) U.S. Cl.
CPC ............ *A47G 7/044* (2013.01); *A01G 9/024* (2013.01)

(58) Field of Classification Search
CPC .......... A01G 9/02; A01G 9/022; A01G 9/023; A01G 9/024; A47G 7/02; A47G 7/025; A47G 7/041; A47G 7/042; A47G 7/044; A47G 7/045; A47G 7/047; A47H 27/00
USPC .............. 211/38, 85.23, 88.03, 90.04, 113; 248/27.8, 317, 318, 328, 693, 912; 47/65.7, 65.8, 67, 83
See application file for complete search history.

(56) References Cited

U.S. PATENT DOCUMENTS

| | | | | | |
|---|---|---|---|---|---|
| 3,709,373 | A | * | 1/1973 | Aguilar | A47F 5/0892 211/113 |
| 3,854,242 | A | * | 12/1974 | Gladstein | A47G 7/047 248/318 |
| D235,601 | S | * | 7/1975 | Humboldt | 47/67 |
| 4,159,094 | A | * | 6/1979 | Stekoll | A47G 7/047 248/318 |
| 4,216,617 | A | * | 8/1980 | Schmidt | A01G 31/06 47/62 A |
| 4,349,172 | A | * | 9/1982 | Banks, Jr. | A47G 7/047 D6/403 |
| 4,654,991 | A | * | 4/1987 | Jones | A63H 33/40 40/124 |
| 4,679,695 | A | * | 7/1987 | Leff | A47J 47/16 211/74 |
| 5,052,148 | A | * | 10/1991 | Sharon | A01G 9/023 248/328 |
| 5,595,395 | A | * | 1/1997 | Wilson | B62B 1/14 280/47.26 |
| 6,158,593 | A | * | 12/2000 | Olsen | A63B 47/00 206/315.9 |
| 7,032,347 | B2 | * | 4/2006 | Hartman | A47G 7/047 47/67 |
| D524,075 | S | * | 7/2006 | Jenkins | D6/405 |

(Continued)

FOREIGN PATENT DOCUMENTS

| | | | | | |
|---|---|---|---|---|---|
| DE | 202004020279 | U1 | * | 6/2005 | ............. A01G 9/023 |
| KR | 1872339 | B1 | * | 6/2018 | ............. A01G 9/023 |

*Primary Examiner* — Joshua E Rodden

(57) ABSTRACT

A lightweight multiple plant hanger is made from flexible straps, designed to hold multiple containers of varying sizes. Predetermined size loops are made from flexible horizontal straps by cutting it to the right size and sewing the ends together. The premade flexible horizontal straps are perpendicularly attached to vertical flexible straps to form openings for the containers. Said vertical straps are hanged on a rigid support by loops made from the same vertical straps. The rigid support has cutouts to guide the vertical straps. The multiple plant hanger can be as a single column or multiple columns connected together by the same premade horizontal straps. For taller plants, an optional attachment (fabric covered wire) can be used by twisting it around the two vertical straps and cover half of the container.

3 Claims, 4 Drawing Sheets

(56) References Cited

U.S. PATENT DOCUMENTS

| | | | | |
|---|---|---|---|---|
| 7,293,664 | B2* | 11/2007 | Belokin | A47F 5/0892 |
| | | | | 211/113 |
| 7,789,250 | B2* | 9/2010 | Aamodt | A63B 47/00 |
| | | | | D6/552 |
| D641,654 | S * | 7/2011 | Hawkinson | D11/144 |
| 8,567,120 | B2* | 10/2013 | Davis | A01G 9/12 |
| | | | | 47/44 |
| 9,826,846 | B1* | 11/2017 | Woody | A47G 7/04 |
| 9,883,642 | B2* | 2/2018 | Friedman | A01G 31/06 |
| 11,089,744 | B2* | 8/2021 | Moffitt | A01G 9/029 |
| 2013/0111812 | A1* | 5/2013 | Fisher | A01G 9/022 |
| | | | | 47/66.7 |

* cited by examiner

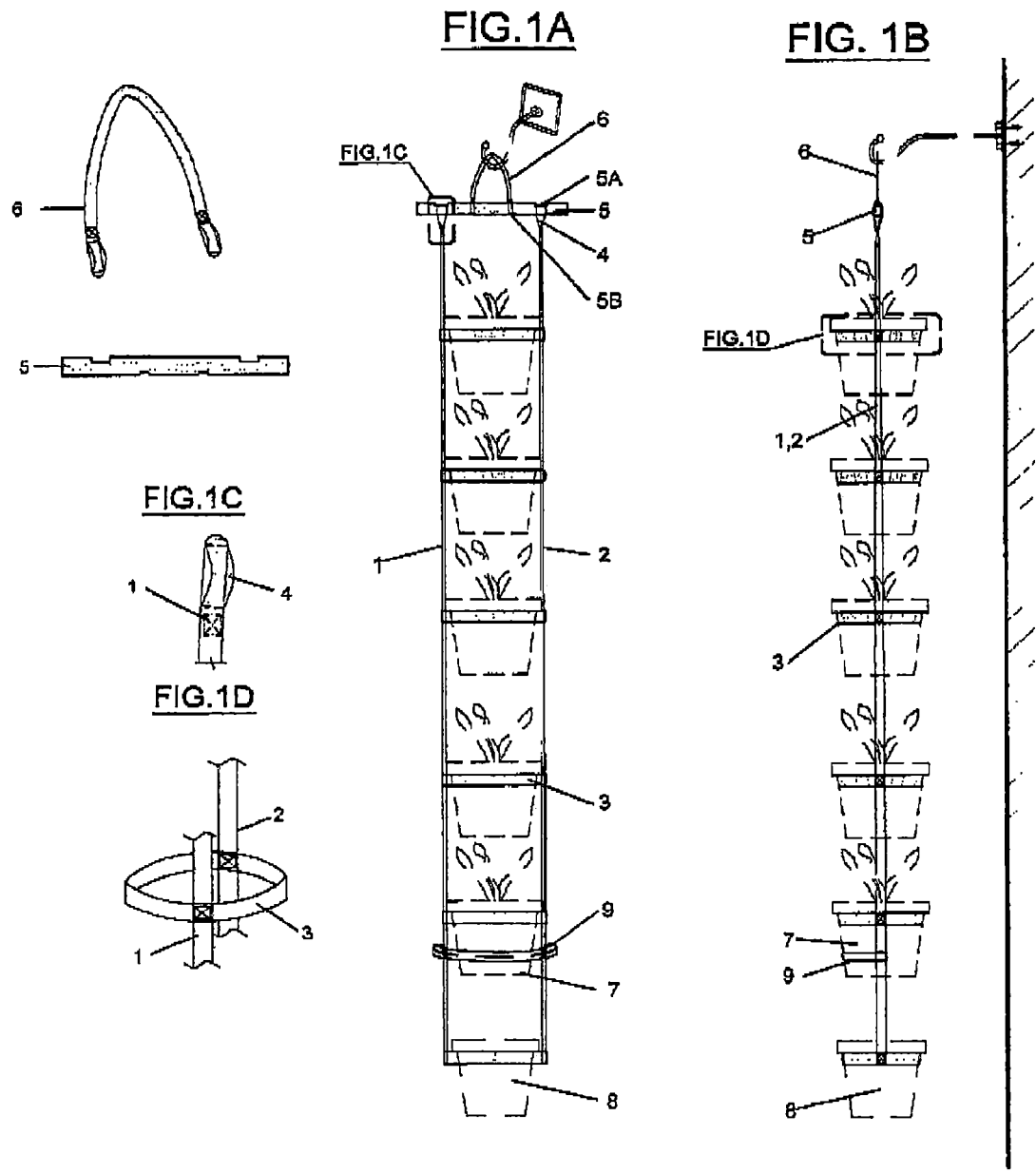

MULTIPLE PLANT HANGER

BACKGROUND OF THE INVENTION

Potted plant hanger assemblies which position one potted plant above or below another potted plant are well known. These plant hanger assemblies are generally constructed of rigid vertical and horizontal supports. The rigid multiple plant hanger assemblies make storage very cumbersome and the hanger assembly requires a vast amount of storage area.

Heretofore, previous potted plant hanger assemblies are not easily maneuverable, heavy, and complicated to ship. They mostly designed for outside use and are less aesthetically appealing.

Moreover, previous vertical hanged potted plant hangers are complicated to make and hard to assemble. It is difficult to add or remove additional segments.

Therefore, a plant hanger assembly is desired that allows easy assembling, takes less space, light construction, easy to ship, and Improved aesthetical appeal.

SUMMARY OF INVENTION

With limited space in urban areas, homes, and nurseries, multilevel plant hangers are highly in demand. The aerated conditions are beneficial to plants health. This multiple plant hanger is designed to be lightweight, sturdy, simple, functional, and beautiful. The novelty design is made of horizontal and vertical flexible straps, connected together perpendicularly to make multiple openings for fitted containers to hang. All the straps are made from outdoor heavy-duty synthetic fabric. Although any flexible straps strong enough to hold plant containers can be used.

First, horizontal straps are made sufficient size to accommodate a plant pot. Straps are precut, the ends of said straps are sewed together to make a loop for a pot to fit. Second, the straps perpendicular attached to predetermined vertical straps to make multiple horizontal rows. This way a single columns is made. To make multiple columns, the premade single columns are attached using the same premade horizontal straps. The upper ends of said vertical straps are bent and attached to the same straps to form hanging loops. The hanging loops can be positioned on a hanging bar directly or it can be hanged on hooks. The rigid support with the cutouts was created for a single column. It helps to keep vertical lines parallel to each other. That adds stability and aesthetic appeal. The weight of Inserted pots makes vertical lines straight. If plant Is tall and leans to one side, a flex strap can be added. The flex strap is made from landscape wire covered with the same fabric the horizontal and vertical straps were made. Said optional attachment is twisted around the vertical straps and cover a half of the pot between the straps.

Although others have invented multiple plant hangers, various aspects of this multiple lightweight plant hanger are superior because it is easier to assemble, lighter to ship, simpler to make, can be used inside or outside, various designs can be easily achieved by adding or removing the columns, extra plant support can be added easily, it Is aesthetically appealing, doesn't take much storage.

BRIEF DESCRIPTION OF THE DRAWINGS

FIG. 1A is a front view of a single column plant hanger;
FIG. 1B is a side view of the single column plant hanger;
FIG. 1C Is a view of an enlarged hanging loop of the vertical strap;
FIG. 1D is an enlarged isometric view of the horizontal strap 5 attached to the vertical straps 1 and 2.

DRAWINGS-REFERRAL NUMBERS

Figure 2A:
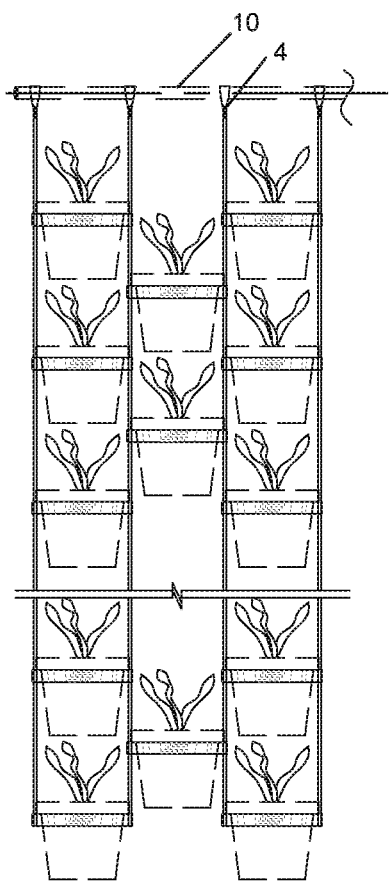
FIG. 2A is a view of multiple columns hanged on a hanging bar 10 directly.

1—vertical strap 1
2—vertical strap 2
3—horizontal strap
4—loop made from vertical strap
5—rigid support
5a—cutout for vertical straps to hang
5b—cutout for holding strap to hang
6—holding strap
7—plant containers
8—water collecting container
9—flex strap-fabric covered landscape wire
10—holding bar 11—hook
12—additional vertical strap 1
13—additional vertical strap 2
14—additional rigid support
14a—cutout of additional rigid support

DETAILED DESCRIPTION

Flexible straps are precut sufficient size to accommodate a plant pot size, the ends of said straps are sewn together individually to make a loop for a plant pot to fit. This way horizontal straps 3 are made. In FIG. 1A is a front view, and in FIG. 1B is a side view of a single column multiple plant hanger. The horizontal straps 3 are perpendicularly attached to vertical straps 1 and 2. Loops 4 (hanging loops) are made by bending and attaching upper ends to the same vertical straps 1 and 2. The isometric view of the connection is in FIG. 1C.

The holding strap 6 is made by bending and attaching both ends towards the center of the same strap. Wooden bar 5 is design to hang the strap hanger, it this case a thin wooden board with cutouts 5a on the top was made to guide the straps, although instead of the cutouts, straps can be stapled to the wood. Any rigid bar instead the wood can be used. The holding strap 6 has to be put in cutouts Sb, following by the loops 4 of vertical straps 1 and 2 in cutouts 5a.

Containers with plants 7 are inserted in the horizontal straps 3. At the bottom row the same container with the plant or a water collector 8 can be placed. By watering on the top, the water drips all the way to the end, and can be collected at the bottom. This way water can be saved.

If plants are leaning, an optional attachment-flex strap 9 can be used. The flex strap 9 is made by covering a landscape wire with a fabric. The attachment can be placed by twisting it around straps 1 and 2 and a half of the plant pot 7.

After single column is made, multi columns can be created by attaching it perpendicularly to already made columns with the same premade horizontal straps 5. The view of the multiple columns connected is in FIG. 2A and FIG. 2B. After desired amount of columns connected, holding loops 4 can be hanged directly on a holding bar 10 (FIG. 2A) or by hanging them on the hooks 11 before they are put on the holding bar 10 (FIG. 2B).

Figure 3A:
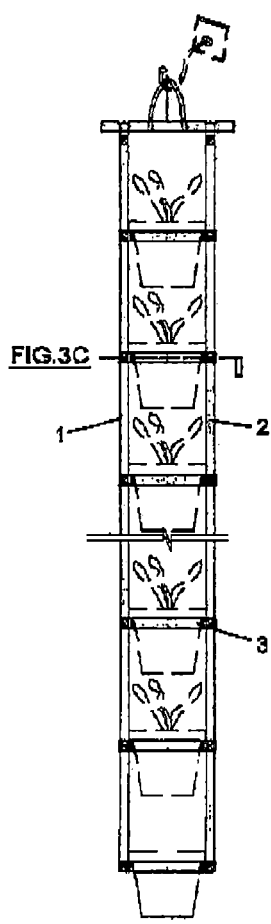
FIG. 3A is a front view of a single column plant hanger (option 2)
Figure 3B:
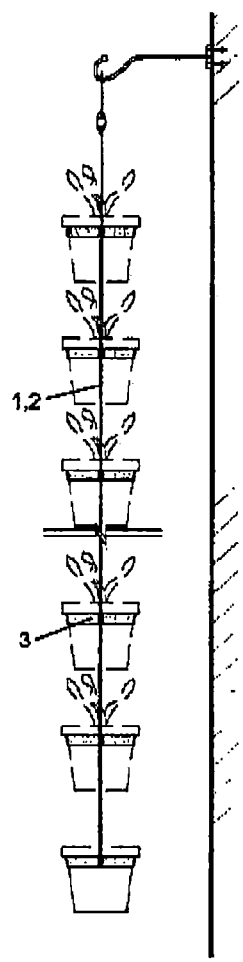
FIG. 3B is a side view of a single column plant hanger (option2)
Figure 3C:
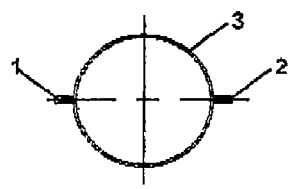
FIG. 3C is an enlarged top view of horizontal strap 5 attached to the vertical straps 1 and 2 (option2)

FIG. 3A is a view of a second option of a single column design. The vertical straps 1 and 2 are turned 90 degrees (comparing to FIG. 1 design), and the horizontal straps 5 go around the vertical straps 1 and 2. The enlarged top view is in FIG. 3C.

Figure 2B:
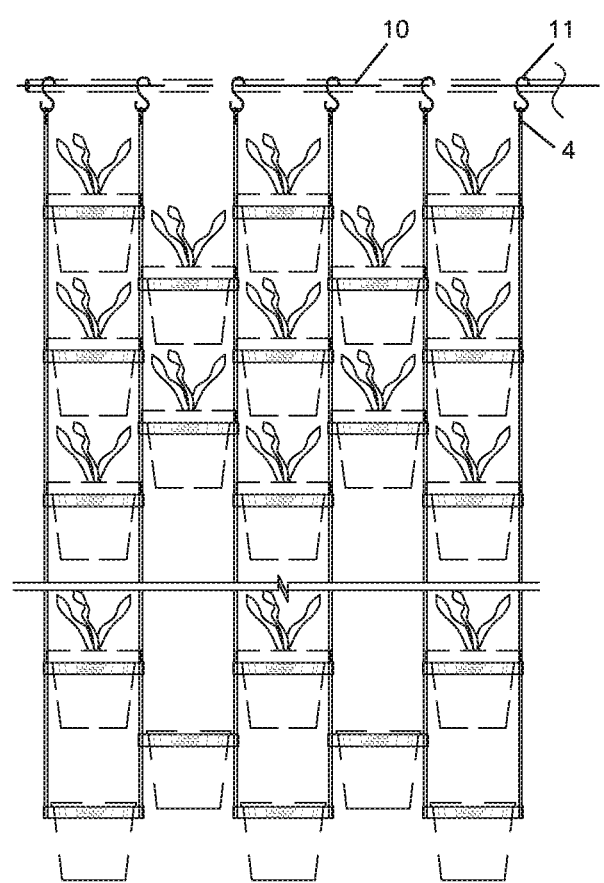
FIG. 2B Is a view of multiple columns hanged on hooks 11 before hanged on the holding bar 10.
Figure 4:
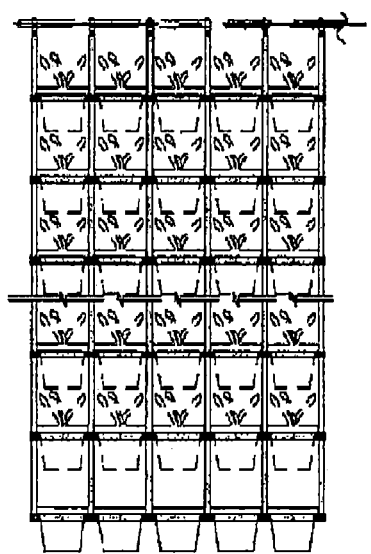
FIG. 4 is a view of multi column design of plant hanger.
Figure 5:
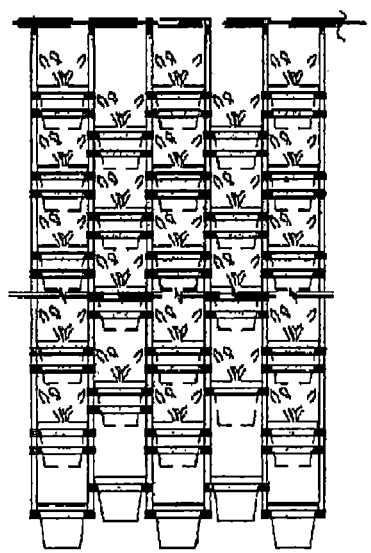
FIG. 5 is a view of multi column design with double horizontal straps.

By creating multiple columns different designs can be achieved as seen in FIG. 4, FIG. 2A, and FIG. 2B. Additional horizontal straps can be added around the pots and vertical straps as seen in FIG. 5.

Figure 6:
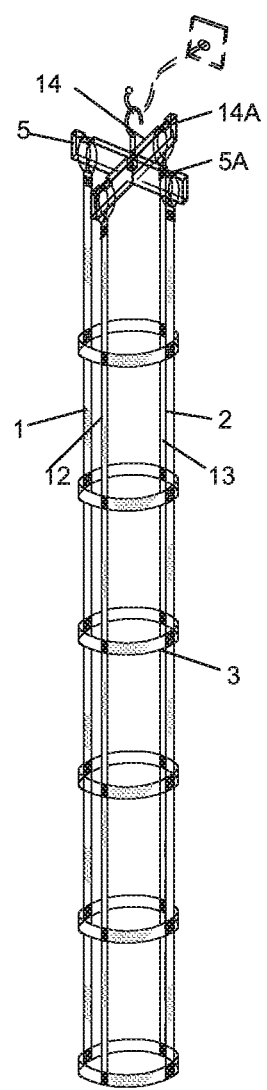
FIG. 6 is an isometrical view with four vertical straps.

In FIG. 6 is an isometric view of multiple plant hanger with four vertical straps instead of two. The vertical straps 12 and 13 added for taller plants. Accordingly, extra rigid support 14 added to hang said straps 12 and 13. Cutouts 5a and 14a and are used to hold vertical straps in place.

CONCLUSION

The novel multiple plant hanger provides advantage over prior art plant hangers. It Is nothing like this in a market. It Is made of lightweight heavy duty flexible horizontal and vertical straps by connecting them perpendicularly to each other to create openings for potted plants to hold. It easy to make and easy to change designs. Optional attachments easy to attach. The novel design can be used in homes, nurseries, stores, gardens, and other desirable places. When the hanger is not in use, doesn't take much space to store. Besides being the space saver, it is aesthetically appealing.

What is claimed is:

1. A multiple plant hanger, comprising:
   a. vertical straps and predetermined loop straps connecting together perpendicularly to make multiple horizontal openings for fitted containers to hang;
   b. upper ends of said vertical straps bending and attaching to the respective vertical straps creating predetermined hanging loops;
   c. a rigid support for receiving said hanging loops;
   d. at least one optional attachment configured to be attached at ends thereof around respective one of the vertical straps for covering and supporting half of one of the fitted containers.

2. The multiple plant hanger as described above in claim 1, wherein the optional attachment is a fabric covered wire.

3. The multiple plant hanger as described above in claim 1, wherein the rigid support contains openings for receiving the hanging loops.

* * * * *